United States Patent [19]

Wu et al.

[11] 4,050,513
[45] Sept. 27, 1977

[54] METHOD OF TREATING A HIGH TEMPERATURE FORMATION TO PERMIT THE USE THEREIN OF TEMPERATURE SENSITIVE HYDROPHILIC, VISCOSITY INCREASING POLYMERS

[75] Inventors: Ching H. Wu, Golden, Colo.; Alfred Brown, Houston, Tex.; Wann-Sheng Huang, Houston, Tex.; Yick-Mow Shum, Houston, Tex.

[73] Assignee: Texaco Inc., New York, N.Y.

[21] Appl. No.: 705,737

[22] Filed: July 15, 1976

[51] Int. Cl.² .............................................. E21B 43/22
[52] U.S. Cl. ..................... 166/274; 166/273; 166/302
[58] Field of Search .............. 166/274, 275, 272, 303, 166/302, 252

[56] References Cited

U.S. PATENT DOCUMENTS

| 3,437,141 | 4/1969 | Brandner et al. | 166/273 |
| 3,858,656 | 1/1975 | Flournoy et al. | 166/274 |
| 3,924,682 | 12/1975 | Wu et al. | 166/274 |
| 3,946,812 | 3/1976 | Gale et al. | 166/273 X |

Primary Examiner—Stephen J. Novosad
Attorney, Agent, or Firm—Carl G. Ries; Thomas H. Whaley; Jack H. Park

[57] ABSTRACT

Polymer flooding is an effective means of increasing the sweep efficiency of a displacement process for recovering petroleum from a subterranean, petroleum containing formation; however, most polymers suitable for use in flooding operations hydrolyze or otherwise decompose at temperatures above about 150° F to 200° F, and the temperature of many subterranean petroleum-containing formations is in excess of 150° F–200° F. Polymers may be employed in tertiary recovery in formations whose temperatures are greater than the temperature stability limit of the polymer if the formation temperature is first reduced by introducing an aqueous fluid such as water at a temperature substantially below the temperature limit of the polymer into the formation for a period of time sufficient to reduce the formation temperature to a value at or below the temperature tolerance level of the polymer.

13 Claims, 2 Drawing Figures

METHOD OF TREATING A HIGH TEMPERATURE FORMATION TO PERMIT THE USE THEREIN OF TEMPERATURE SENSITIVE HYDROPHILIC, VISCOSITY INCREASING POLYMERS

BACKGROUND OF THE INVENTION

1. Field of the Invention

This invention concerns a process for pretreating high temperature, petroleum containing formations so petroleum may be recovered therefrom by the use of temperature sensitive polymers.

2. Description of the Prior Art

Many subterranean, petroleum containing formations contain natural energy in the form of an active bottom water drive, solution gas drive, or a gas cap drive, in sufficient quantity to drive the petroleum through the formation to the production well from which it may be recovered to the surface of the earth. This phase of oil recovery, commonly known as primary recovery, recovers only a small portion of petroleum originally in place. When the natural energy source has been depleted, or in those formations where insufficient natural energy was originally present to permit primary recovery, some form of supplemental treatment is required to recover additional petroleum from the formation. Water flooding is by far the most economical and widely practiced supplemental recovery procedure and involves injecting water into the formation by one or more injection wells. The injection water displaces or moves the petroleum toward one or more production wells, where it is transported to the surface of the earth. Although considerable additional oil is usually recovered as a consequence of water flooding, as a general rule around 50% or more of the oil originally present in the formation remains in the formation after termination of water flooding.

It is well known in the field of oil recovery that the inclusion of even a small amount of a hydrophilic polymer in the flood water will increase the displacement efficiency by a substantial amount. Many materials have been proposed for use in polymer flooding oil recovery processes. Polyacrylamides and polysaccharides are very effective for use in oil recovery operations in dilute concentrations, i.e., from 200 to 1000 parts per million. Sulfated, ethoxylated alkyl or alkylaryl compounds are also effective in slightly higher concentrations.

Although it has been demonstrated in laboratory tests and published in the art, that the inclusion of a hydrophilic, viscosity increasing material in flood water will recover substantial amounts of additional petroleum from petroleum formations under ideal conditions, there are many conditions existing in subterranean petroleum containing formations which significantly degrades the performance of polymer solution injection. One of the most serious problems is the temperature limitation of most polymers. Most of the polymers proposed up to the present time for use in polymer flooding oil recovery processes will hydrolyze or otherwise deteriorate in aqueous solution when exposed to temperatures in excess of 150° F–200° F for long periods of time. Since a great many subterranean petroleum containing formations are hotter than 150° F–200° F, and since the polymer solution injected into a subterranean, petroleum-containing formation will ordinarily be in the formation for a period of many months or even years, the hydrolysis or other degradation of this polymer material reduces the polymer flooding recovery efficiency substantially.

In our U.S. Pat. No. 3,924,682 issued Dec. 9, 1975, there is disclosed a method for treating a subterranean oil formation to reduce it's temperature to permit use therein of a temperature sensitive surfactant.

In view of the foregoing discussion, it can be appreciated that there is a substantial, unfulfilled need for a method for conducting a polymer oil recovery process in subterranean, petroleum containing formations whose temperature is in excess of 150° F–200° F.

SUMMARY OF THE INVENTION

Figure 1:
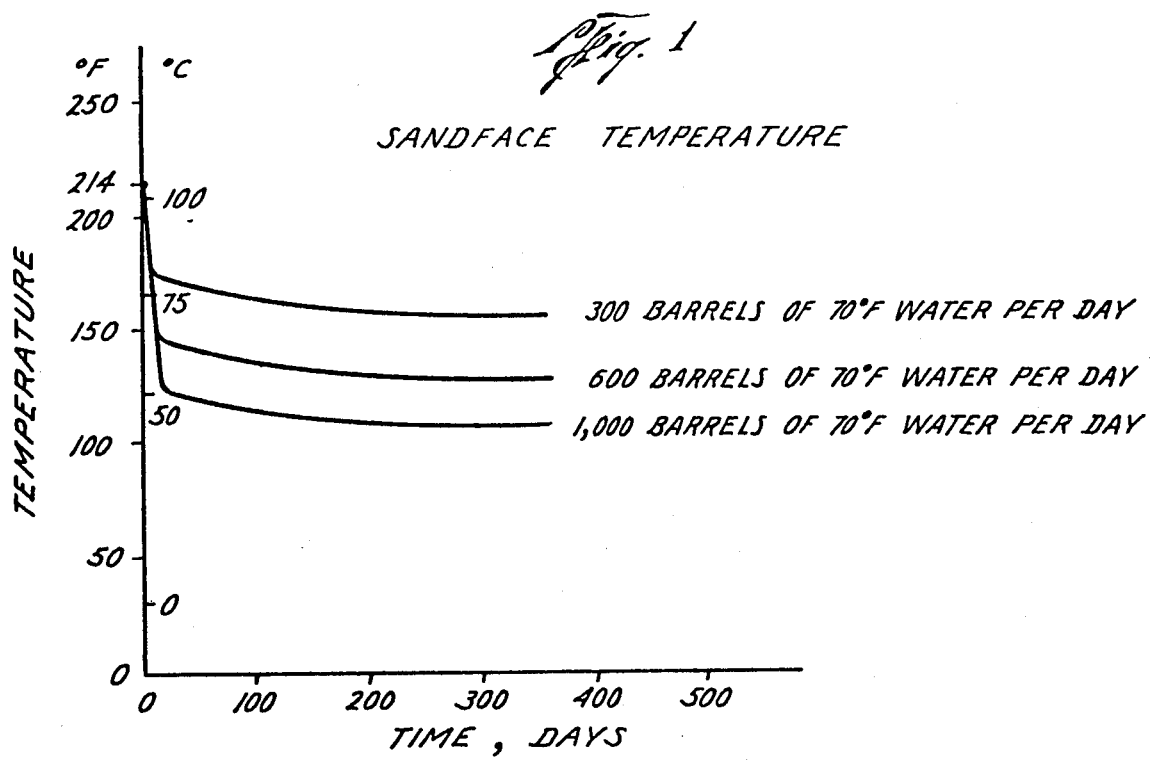
FIG. 1 illustrates the formation temperature at the injection well at three values of cooling fluid injection rates.

We have discovered that it is possible to cool a subterranean, petroleum containing formation to a temperature below the temperature limits of the hydrophilic polymer solution to be employed in a polymer oil recovery process in the formation. It is possible to achieve the temperature reduction in some cases by injection of surface ambient temperature water into the formation for a period of time substantially longer than would ordinarily be accomplished in a conventional water flooding operation, i.e. for long periods of time past the point when the produced fluid is essentially 100% water. In another embodiment, the water or other aqueous fluid being injected into the subterranean formation is cooled to a temperature lower than surface ambient temperature prior to injection of the aqueous fluid into the formation. Mechanical refrigeration, gas adsorption, or direct evaporization in air in arid climates may be utilized to cool the water prior to injection into the formation. If the reservoir parameters are known, the time necessary to inject an aqueous fluid of any available or preselected temperature into the formation in order to reduce the temperature of the formation to the desired level may be calculated by means disclosed herein below. The aqueous cooling fluid may also contain chemicals for the purpose of accomplishing other desired chemical pretreatment of the formation, such as adjusting the salinity and/or hardness of the formation water to the point at which optimum polymer response is achieved, or sacrificial adsorption reagents may be included for the purpose of accomplishing other desired chemical pretreatment of the formation, such as adjusting the salinity and/or hardness of the formation water to the point at which optimum polymer response is achieved, or sacrificial adsorption reagents may be included for the purpose of adsorbing on the formation surfaces to prevent polymer adsorption, or incorporating a chemical to control water sensitive clay materials contained in the formation so as to prevent loss of formation permeability.

DESCRIPTION OF THE PREFERRED EMBODIMENT

Briefly, the process of our invention involves introducing a fluid into a subterranean, petroleum containing formation, the fluid being at a lower temperature than the formation and passing the cooling fluid through the formation for a period of time sufficient to reduce the formation temperature so that the temperature sensitive polymers may be injected safely into the formation for oil recovery purposes.

The temperature of the cooling fluid should be substantially less than the maximum temperature at which the polymer is stable. Preferably the temperature of the cooling fluids is at least 50° F less than the maximum temperature at which the polymer is stable.

Water injection or water flooding is, of course, well known in the art of oil recovery, and when surface temperature water is injected into a subterranean, petroleum-containing formation for the purpose of displacing the petroleum toward the production well in a conventional waterflood operation, a limited amount of cooling of portions of the formation occurs as a necessary consequence of water injection. It is common practice in water flooding, however, to terminate water injection when the water-oil ratio begins to increase to the point that further fluid production is no longer economically feasible. As a general rule, the water-oil ratio will be quite low initially since a bank of oil is formed in the formation as a consequence of water injection, and little or no water is produced along with the oil during the time that this bank of oil is being produced. Once the trailing edge of the bank reaches the production well, the percentage of water produced increases rapidly. Once the water-oil ratio is above about 25 or 30, further injection of water and production of water and oil from the production well is no longer economically feasible in the ordinary context of secondary recovery, and so water injection is terminated and further production of fluids from the production wells is similarly terminated. Since the production is terminated shortly after water reaches the production well, very little cooling water will have passed through the formation in the immediate vicinity of the production well, and so the formation cooling effect in conventional water flooding is restricted to the portion of the formation immediately adjacent to the water injection well and does not extend sufficiently far into the formation to accomplish the desired result of reducing the over all formation temperature so temperature-sensitive polymers may be utilized therein.

Frequently polymers are used in combination with surfactants and formation cooling will be required if either the surfactant or the polymer is unstable at the natural formation temperature. If both the surfactant and the polymer are temperature sensitive, then the formation temperature must be reduced to a value less than the lower of the temperatures limits of surfactant and polymer. It is often possible to achieve the desired formation temperature reduction by continuing injection of surface ambient temperature water such as is used in water flooding operations for a much longer period of time than would ordinarily be done in a conventional water flood operation. This requires that water injection must continue long after the fluid being produced at the production well goes to substantially 100% water. The produced water may be recirculated to minimize water disposal problems, but in that event it will usually be necessary to cool the water prior to reinjecting it since the water temperature exiting from the production well will naturally be considerably higher than the temperature of the water being injected due to its' contact with the hot formation. If a convenient disposal area is available for the water, and an abundant supply of suitable injection water is available, the desired temperature reduction may be achieved by simply continuing injecting surface-ambient temperature water into the formation. In any event, it will be necessary to determine the time duration of water injection, and this will be accomplished in essentially the same manner as if the water is cooled prior to being injected. The method for calculating the injection time necessary to achieve a desired temperature reduction will be given hereinafter below.

In some situations, the practice of the process of our invention involves a cooling process whereby the temperature of the water is reduced either below surface ambient temperature or below the temperature of the water being produced from the production well in the case where produced water is recycled. Water may be cooled by the use of mechanical refrigeration or a gas fired adsorption process. If the operation is being conducted in an fairly arid region, it is satisfactory to pass the water through a cooling tower or some similar device to expose the water to dry air so that the water will be cooled by evaporation. Direct heat exchangers may also be used in the instance of application of the process of our invention during winter months or in cold climates. Whenever possible, it is preferred to use air evaporation or direct air heat exchangers to avoid the use of mechanical refrigeration because of the higher operational costs involved in mechanical cooling processes.

The fluid may be cooled to any temperature above its freezing point and substantially less than, preferably at least 50° F less than the maximum temperature at which the polymer to be used is stable for the period of time it will be in the formation.

The calculation of the time which water injection is required to achieve the desired temperature drop involves first calculating the heat gained by the injected cold water as it passes down the injection well bore and then from the point of injection radially outward into the formation. The problem then becomes essentially the same as one of calculating the heat loss in the instance of injecting a thermal fluid, which problem has been quite well worked out for steam injection situations. The only difference is that heat is gained as the fluid passes down the injection well bore and outward into the formation, rather than being lost as is the case for steam flooding.

The heat loss-gain problem becomes one more readily handled if it is subdivided into the two principal steps:
1. The heat gained as the cold fluid is injected down the injection well bore, and;
2. The heat gained as the fluid passes from the point of injection radially outward into the formation.

In the first step of calculating the heat gained by the injected cold fluid, consider the passage of the fluid through a radial injection well bore. The heat gained by the flowing fluid may be expressed by means of the following equation (1).

$$Q_G = H_{out} - H_{in} = q_w C_w {}_w (T_{out} - T_{in}) \quad (1)$$

where
$Q_G$ = heat gained by the fluid passing down the injection well bore.
$H_{in}$ = enthalpy of the water at the inlet end of the injection well bore.
$H_{out}$ = enthalpy of water at the outlet end of the injection well bore.
$q_w$ = volumetric water injection rate
$C_w$ = the specific heat capacity of water $\rho_w$ = water density
$T_{in}$ = tubing temperature at the inlet end
$T_{out}$ = tubing temperature at the outlet end.

Assuming that the amount of heat transferred across the well annulus from the formation to the fluid passing through the injection well is instantaneously supplied from the formation gives equation (2):

$$Q_G = UA_{to}(T_c - T_t) = \pi D_c L \Phi \qquad (2)$$

The middle term represents an overall heat transfer across the annulus:
$U$ = overall heat transfer coefficient
$A_{to}$ = total heat transfer area
$T_t$ = average tubing temperature, $(T_{out} - T_{in})/2$
$T_c$ = average casing temperature The right hand side represents conductive heat transfer from the formation around the well bore:
$D_c$ = casing diameter
$L$ = casing length of the controlled segment
$\Phi$ = heat flux determined by a superposition method based on the variation of $T_c$ with time.

By considering that the injection well is divided along its long axis into a number of segments, equation 1 is solved for each segment from the well head to the sand face by a trial and error method to determine the injected water temperature at the sand face. Since in most formations, there is a relatively constant thermal gradient between the surface and the formation, the calculations are relatively straightforward.

The second step involves determining the heat gained by the injection fluid as it passes outward from the point of injection into the formation. Assuming essentially radial spreading of the injected fluid uniformly throughout the full formation thickness, gives equation (3):

$$2_\pi r (\Delta r) h (\rho C)_p \Delta T = -k_p \left[ 2_\pi (r - \frac{\Delta r}{2}) h \Delta t \frac{(\Delta T)}{(\Delta r)} \Big|_{r - \frac{\Delta r}{2}} \right]$$

$$+ k_p \left[ 2_\pi (r = \frac{\Delta r}{2}) h \Delta t \frac{(\Delta T)}{(\Delta r)} \Big|_{r + \frac{\Delta r}{2}} + 4_\pi r \Delta r k_s \frac{\Delta T}{\Delta Z} \Big|_{Z = h} \right] \Delta t$$

$$+ \frac{i_{wh}(H_{cw} - H_w)}{T_{cw} - T_o} \left[ T \Big|_{r - \frac{\Delta r}{2}} T \Big|_{r + \frac{\Delta r}{2}} \right] \Delta t$$

i.e. Heat Accumulation = Heat Conduction In — Heat Conduction Out + Heat Flux from Bonding Formation + Heat Convection In — Heat Convection Out, where
$r$ = radial coordinate
$h$ = reservoir thickness
$(\rho C)p$ = composite heat capacity of pay zone
$\Delta T$ = temperature increment
$k_p$ = pay zone thermal conductivity
$\Delta t$ = time increment
$z$ = vertical coordinate
$k_s$ = bonding formation thermal conductivity
$i_w$ = water injection rate
$H_{cw}$ = enthalpy of injected cold water
$H_w$ = enthalpy of water at reservoir temperature
$T_{cw}$ = injected water temperature (sand face)
$T_o$ = reservoir temperature The above equation may be solved numerically to obtain the temperature distribution in the reservoir as a function of injection time. Solutions of this equation for a series of preselected values of time of injection and water temperature yield a series of curves similar to that given in the attached FIG. 2 for a particular application. Any one curve gives the temperature in the formation as a function of distance from the point of injection.

EXAMPLES

Mathematical calculations based on the above formula were performed using field data from the Caillou Island Field in Louisiana. The reservoir properties and completion data are listed in Table I.

TABLE I

| RESERVOIR AND COMPLETION DATA | |
|---|---|
| | Caillou Island Field |
| Depth | 11,000 ft. |
| Formation Thickness | 27 ft. |
| Reservoir Temperature | 214° F |
| Permeability | 2,400 millidarcies |
| Porosity | 27% |
| Oil Saturation | 65% |
| Oil Viscosity | 0.10 centipoise at 214° F |
| Water Viscosity | .28 centipoise at 214° F |

The calculations were made on the assumption that a 30 acre inverted five spot pattern was used, that the injection tubing was three inches internal diameter and the casing was five inches internal diameter. Calculations were made for injection rates of 300, 600, and 1,000 barrels of water per day, at an assumed injection water temperature of 70° F.

In the first step, the water at the injection well point of entrance into the formation, e.g. the sand face temperature was calculated for each of the three injection rates, and the results are shown graphically in FIG. 1.

The sand face temperature as a function of time for the three injection rates are given in FIG. 1. It can be seen that the sand face temperature drops dramatically in the first 10 days of cold water injection, and thereafter levels off to a nearly constant value quite rapidly. The value at which it becomes constant is, however, a function of the cold water injection rate, with the sand face constant temperature being lower with high injection rates.

Figure 2:
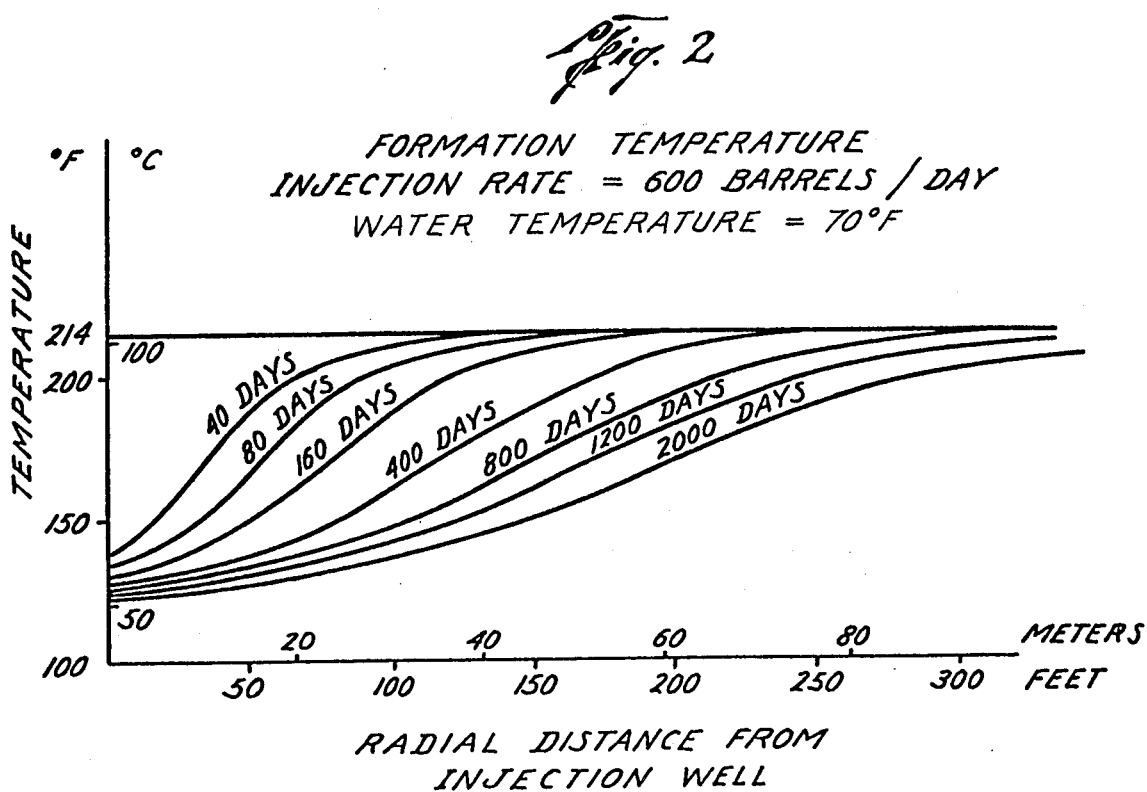
FIG. 2 illustrates the temperature in a formation at various distances from the point of injection of a 70° F cooling liquid at seven different injection rates.

The formation temperature at any point away from the injection well is shown in FIG. 2 for the 600 barrel per day injection rate case. As can be seen, depending on the number of days of injection, one can determine the temperature at any particular distance from the injection well. All of the temperature profile lines tend to approach the original formation temperature, but the distance from the injection well at which they reach the original formation temperature increases with increasing periods of cold (70° F in this case) water injection.

At greater injection rates, the formation temperature reduction to the desired level can be extended further into the formation away from the point of injection. For example, at a water injection rate of 1,000 barrels per day and an injection period of 1600 days, the reservoir temperature 200 ft. from the injection well can be lowered from 214° F to less than 150° F.

It can be seen from the above that the cooling effect may be increased by injecting colder water, or for constant temperature water, by injecting at a higher rate or for longer periods of time. Of course, the polymer solution should be injected at or near the same temperature as the cooling fluid solution in order to maintain the reduced temperature effect within the formation. The temperature profile lines shown in the attached figures are dynamic conditions, and the temperature at any point in the formation will increase with time after the injection of cold fluid into the formation is terminated. Accordingly, any fluids injected prior to the polymer solution or the polymer solution itself should similarly be reduced in temperature to the desired cooling fluid temperature in order to ensure that the polymer solution is not subjected to temperatures greater than its decomposition level. It is generally preferable to cool any subsequent water injection after injecting the polymer solution to avoid a temperature rise at the trailing edge of the polymer solution, and surface ambient temperature water may be used to displace the polymer solution through the formation so long as a suitable quantity of cold fluid has been injected subsequent to the polymer solution.

Field Example

The following field example is offered for purposes of additional disclosure only and is not intended to be in any way limitative or restrictive of our invention.

A polymer flood is contemplated in a reservoir having the following properties:

| | |
|---|---|
| Depth | 1,646 meters (5,400 ft.) |
| Thickness | 10.4 meters (34 ft.) |
| Reservoir Temperature | 52° C (154° F) |
| Permeability | 0.3 μm² (315 md.) |
| Porosity | 27% |
| Initial Oil Saturation | 58% |
| Oil Viscosity | .0021 Pa-s (2.1 centipoise) at the formation temperature |

In the first step, heat gain calculations are performed as given above assuming 70° F water temperature, and it is determined that at an injection rate of 300 barrels of 70° F water per day the temperature at the sand face drops initially as described previously, and then levels out at approximately 102° F. At 600 barrels of 70° F water per day, the sand face temperature becomes constant at about 90° F; at 1000 barrels of 70° F water per day, the sand face temperature levels out at about 80° F; at 3000 barrels of 70° F water per day, the constant level is about 75° F; and at 5000 barrels of water per day, about 70° F.

The formation temperature at depth was determined for the 1000 barrels of water per day injection rate case assuming the injection water temperature is 70° F. The formation temperature is reduced to 125° at 50 ft. distance in 50 days; at approximately 75 ft. in 80 days; at approximately 105 ft. in 160 days; at 164 ft. in 400 days; at 210 ft. in 1200 days; and 240 ft. in 2000 days.

Based on the above calculations, the flood is performed as follows. Cold water at a temperature of 70° F is injected into the formation at an injection rate of 1000 barrels per day for 400 days, until a total of 400,000 barrels of cold water has been injected. Thereafter a 102,816 barrel slug of polymer solution is injected into the formation at 1000 barrels per day. The fluid used comprises 500 parts per million of a partially hydrolyzed polyacrylamide. The temperature of the polymer solution is also maintained at 70° F in order to maintain the dynamic cooling conditions in the formation. After conclusion of the polymer solution injection phase, 70° water is injected into the formation to displace the polymer solution through the formation. The above calculations are based on a five acre, five spot pattern. Using a five acre, five spot pattern, an additional 34.6 percent of the reservoir is swept, resulting in a like increase in amount of oil recovered. In using a 30 acre pilot, only six additional percent is recovered because of the difficulty in cooling the greater areas involved using the same water temperature and injection rate.

Thus we have disclosed and shown how a subterranean petroleum containing formation may be exploited by means of polymer flooding even though the safe temperature limit of the polymer is substantially below the formation temperature if the formation is first preconditioned by injecting cold fluid such as water at a temperature well below the polymer temperature limit into the formation for a suitable period of time to reduce the formation temperature to a safe limit. While our invention has been described in terms of a number of illustrative embodiments, it is not so limited since many variations thereof will become apparent to persons skilled in the art of supplemental oil recovery without departing from the true spirit and scope of our invention. Similarly, while a mechanism has been described to explain the benefits resulting from the use of our process, it is not necessarily represented hereby that this is the only or even the principal mechanism responsible for these benefits, and we do not wish to be bound by any particular explanation of the mechanism involved. It is our intention and desire that our invention be restricted and limited only by those limitations and restrictions as appear in the Claims appended hereinafter below.

We claim:

1. In a method of recovering petroleum from a subterranean, petroleum-containing formation comprising injecting a viscous, aqueous fluid containing a hydrophilic, viscosity increasing polymer selected from the group consisting of polysaccharides, polyacrylamides, and mixtures thereof wherein the formation temperature exceeds the temperature at which the polymer is stable, wherein the improvement comprises:

introducing a cooling fluid into the formation at a temperature substantially lower than the temperature at which the polymer is stable for a period of time sufficient to reduce the portion of the formation to be contacted by the polymer to a temperature level at which the polymer is stable.

2. A method as recited in claim 1 wherein the cooling fluid is subjected to the step of cooling by refrigeration prior to injecting the same into the formation.

3. A method as recited in claim 1 wherein the cooling fluid is injected at surface ambient temperature and injection thereof is continued well past the point where the fluid being recovered from the formation is substantially all water, sufficient to reduce the temperature in the formation near the production well to the predetermined temperature at which the polymer is stable.

4. A method as recited in claim 1 wherein the cooling fluid is water.

5. A method as recited in claim 4 wherein the water salinity is adjusted to precondition the formation for optimum polymer performance.

6. A method as recited in claim 4 wherein the hardness of the cooling water is adjusted to a level to precondition the formation for optimum polymer performance.

7. A method as recited in claim 1 wherein the cooling fluid temperature is at least 50° F lower than the temperature at which the polymer is stable.

8. A method as recited in claim 1 wherein the formation temperature is reduced to a value below 150° F.

9. A method as recited in claim 1 wherein the polymer is polyacrylamide.

10. A method as recited in claim 1 wherein the polymer is polysaccharide.

11. A polymer flooding method for recovering petroleum from a subterranean, permeable, petroleum-containing formation penetrated by at least one injection well and by at least one production well, the formation temperature being greater than the temperature at which the polymer is stable, comprising:

a. injecting an aqueous fluid into the formation via the injection well, the temperature of the fluid being substantially less than the temperature at which the polymer is stable;

b. injecting a viscous, aqueous fluid containing a hydrophilic, viscosity increasing polymer selected from the group consisting of polyacrylamide, polysaccharide and a mixture thereof, into the formation via the injection well, the temperature of the polymer solution being less than the temperature at which the polymer is stable, and;

c. recovering petroleum displaced by the polymer-containing fluid from the formation via the production well.

12. A method as recited in claim 11 wherein the polymer is polyacrylamide.

13. A method as recited in claim 11 wherein the polymer is polysaccharide.

* * * * *